United States Patent
Satzinger et al.

(10) Patent No.: US 12,204,993 B2
(45) Date of Patent: Jan. 21, 2025

(54) PARALLEL CROSS ENTROPY BENCHMARKING

(71) Applicant: Google LLC, Mountain View, CA (US)

(72) Inventors: Kevin Satzinger, Goleta, CA (US); Charles Neill, Goleta, CA (US); Julian Shaw Kelly, Santa Barbara, CA (US); Andrew Dunsworth, Goleta, CA (US)

(73) Assignee: Google LLC, Mountain View, CA (US)

( * ) Notice: Subject to any disclaimer, the term of this patent is extended or adjusted under 35 U.S.C. 154(b) by 507 days.

(21) Appl. No.: 17/623,194

(22) PCT Filed: Oct. 25, 2019

(86) PCT No.: PCT/US2019/058036
§ 371 (c)(1),
(2) Date: Dec. 27, 2021

(87) PCT Pub. No.: WO2020/263301
PCT Pub. Date: Dec. 30, 2020

(65) Prior Publication Data
US 2022/0358392 A1    Nov. 10, 2022

Related U.S. Application Data (60) Provisional application No. 62/868,451, filed on Jun. 28, 2019.

(51) Int. Cl.
*G06N 10/20*    (2022.01)
*G06N 10/70*    (2022.01)

(52) U.S. Cl.
CPC .......... *G06N 10/20* (2022.01); *G06N 10/70* (2022.01)

(58) Field of Classification Search
CPC ............................. G06N 10/20; G06N 10/70
(Continued)

(56) References Cited

U.S. PATENT DOCUMENTS 11,321,625 B2 *  5/2022  Gambetta ............... G06N 10/00
11,586,702 B2 *  2/2023  Shehab ..................... G06F 17/11
(Continued)

FOREIGN PATENT DOCUMENTS

CN    109478258    3/2019
CN    109643398    4/2019

OTHER PUBLICATIONS

International Preliminary Report on Patentability in International Appln. No. PCT/US2019/058036, mailed on Jan. 6, 2022, 13 pages.
(Continued)

*Primary Examiner* — Jack Chiang
*Assistant Examiner* — Suchin Parihar
(74) *Attorney, Agent, or Firm* — Fish & Richardson P.C.

(57) ABSTRACT

Methods, systems and apparatus for benchmarking quantum computing hardware. In one aspect, a method includes defining an initial circuit configured to operate on an array of qubits, wherein the initial circuit comprises multiple instances of the two-qubit gate, wherein each instance of the two-qubit gate performs a same operation on a respective pair of neighboring qubits in the array; partitioning the initial circuit into multiple layers, wherein instances of the two-qubit gate in a respective layer can be implemented in parallel; for each of the multiple layers: constructing benchmarking circuits for the layer, wherein each benchmarking circuit for the layer comprises one or more cycles of quantum gates, each cycle comprising: the layer of instances of the two-qubit gate, and a plurality of single qubit gates; implementing the constructed benchmarking circuits to obtain experimental benchmarking data; and adjusting control parameters of the control model using the experimental benchmarking data.

12 Claims, 5 Drawing Sheets

(58) Field of Classification Search
USPC .......................................................... 716/136
See application file for complete search history.

(56) References Cited

U.S. PATENT DOCUMENTS

| | | | | |
|---|---|---|---|---|
| 12,033,032 | B2* | 7/2024 | Scheer | G06N 10/70 |
| 2019/0042677 | A1* | 2/2019 | Matsuura | G06N 10/00 |
| 2019/0205783 | A1* | 7/2019 | Nam | G06N 10/00 |
| 2020/0394537 | A1* | 12/2020 | Wang | G06N 10/00 |
| 2021/0390235 | A1* | 12/2021 | Bravyi | G06N 10/20 |
| 2022/0383180 | A1* | 12/2022 | Castrillo | G06N 10/00 |
| 2023/0359922 | A1* | 11/2023 | Klimov | G06N 10/20 |
| 2023/0385674 | A1* | 11/2023 | Wan | G06N 10/40 |
| 2023/0418896 | A1* | 12/2023 | Elfving | G06N 10/60 |
| 2024/0152795 | A1* | 5/2024 | van den Berg | G06N 10/20 |

OTHER PUBLICATIONS

Office Action in Canadian Appln. No. 3143673, dated Jan. 16, 2023, 6 pages.
Notice of Allowance in Australian Appln. No. 2019455705, mailed on Dec. 5, 2023, 3 pages.
Office Action in Australian Appln. No. 2019455705, dated Feb. 17, 2023, 3 pages.
AU Office Action in Australian Appln. No. 2019455705, dated Dec. 5, 2022, 3 pages.
Arute et al., "Quantum supremacy using a programmable superconducting processor" Nature, 2019, 7 pages.
Boixo et al., "Characterizing Quantum Supremacy in Near-Term Devices" arXiv, 2017, 23 pages.
Erhard et al., "Characterizing large-scale quantum computers via cycle benchmarking" arXiv, 2019, 13 pages.
Kelly et al., "Optimal quantum control using randomized benchmarking" Physical Review, 2014, 5 pages.
PCT International Search Report and Written Opinion in International Appln. No. PCT/US2019/058036, dated Mar. 2020, 19 pages.
Office Action in Chinese Appln. No. 201980097981.7, mailed on Nov. 18, 2024, 14 pages (with English translation).

* cited by examiner

PARALLEL CROSS ENTROPY BENCHMARKING

CROSS-REFERENCE TO RELATED APPLICATIONS

This application is a National Stage Application under 35 U.S.C. § 371 and claims the benefit of International Application No. PCT/US2019/058036, filed on Oct. 25, 2019, which claims priority to U.S. Provisional Application Ser. No. 62/868,451, filed on Jun. 28, 2019. The disclosures of the prior applications are considered part of and are incorporated by reference in the disclosure of this application.

BACKGROUND

This specification relates to quantum computing.

Quantum computing uses quantum-mechanical phenomena such as superposition and entanglement to perform computations. A quantum circuit is one example model for quantum computation in which a computation is a sequence of quantum logic gates, which are reversible transformations on a quantum mechanical analog of an n-bit register.

SUMMARY

This specification describes techniques for benchmarking multi-qubit quantum gates.

In general, one innovative aspect of the subject matter described in this specification can be implemented in a method that includes defining a control model for implementing a two-qubit quantum gate; adjusting the control model for implementing the two-qubit quantum gate, the adjusting comprising: defining an initial quantum circuit configured to operate on an array of qubits, wherein the initial quantum circuit comprises multiple instances of the two-qubit gate, wherein each instance of the two-qubit gate performs a same operation on a respective pair of neighboring qubits in the array of qubits; partitioning the initial quantum circuit into multiple layers of instances of the two-qubit gate, wherein instances of the two-qubit gate in a respective layer can be implemented in parallel; for each of the multiple layers of instances of the two-qubit gate: constructing one or more benchmarking circuits for the layer, wherein each benchmarking circuit for the layer comprises one or more cycles of quantum gates, each cycle comprising: the layer of instances of the two-qubit gate, and a plurality of single qubit gates, wherein each single qubit gate in the plurality of single qubit gates corresponds to a respective qubit in the array of qubits; implementing the constructed benchmarking circuits to obtain experimental benchmarking data; and adjusting control parameters of the control model for implementing the two-qubit quantum gate using the generated experimental benchmarking data.

Other implementations of this aspect include corresponding classical and quantum computer systems, apparatus, and computer programs recorded on one or more computer storage devices, each configured to perform the actions of the methods. A system of one or more classical and/or computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations constructing a benchmarking circuit for a layer of instances of the two-qubit gate comprises assigning one or more clock cycles of quantum gates to the array of qubits, comprising, for each clock cycle: randomly sampling multiple single-qubit quantum gates from a predetermined set of single-qubit quantum gates, wherein each randomly sampled single-qubit quantum gate corresponds to a respective qubit in the array of qubits; assigning the randomly sampled multiple single-qubit quantum gates to respective qubits in the array of qubits, and assigning the instances of the two-qubit gate in the layer to respective pairs of nearest neighboring qubits in the array of qubits.

In some implementations the predetermined set of single-qubit quantum gates comprises $X_{\frac{1}{2}}$, $Y_{\frac{1}{2}}$, and T quantum gates, wherein $X_{\frac{1}{2}}$ represents a $\pi/2$ rotation aroung the X axis, $Y_{\frac{1}{2}}$ represents a $\pi/2$ rotation aroung the y axis, and T represents a non-Clifford diagonal matrix $\{0, e^{i\pi/4}\}$.

In some implementations assigning the randomly sampled multiple single-qubit quantum gates to respective qubits in the array of qubits comprises: assigning a second single-qubit gate to qubit q for a current clock cycle, wherein the second single-qubit gate is different to a first single-qubit gate assigned to the qubit q for a preceding clock cycle.

In some implementations constructing one or more benchmarking circuits for the layer comprises constructing multiple benchmarking circuits with different respective circuit depths.

In some implementations implementing the constructed benchmarking circuits to obtain experimental benchmarking data comprises, for each constructed benchmarking circuit: initializing each qubit in the array of qubits in an initial state; applying the constructed benchmarking circuit to the initialized qubits in the array of qubits, wherein instances of the two-qubit gate in each layer of instances of the two-qubit gate are implemented in parallel; measuring each qubit in the array of qubits to obtain measurement data for each qubit; and extracting experimental benchmarking data from the measurement data.

In some implementations the method further comprises, prior to applying the constructed benchmarking circuit to the initialized qubits in the array of qubits, applying a Hadamard gate to each qubit in the initial state.

In some implementations adjusting control parameters of the control model for implementing the two-qubit quantum gate using the generated experimental benchmarking data comprises: classically simulating each constructed benchmarking circuit to obtain classical benchmarking data that represents output distribution of ideal implementations of the constructed benchmarking circuits; comparing the classical benchmarking data to the experimental benchmarking data, comprising determining the cross entropy difference between the classical benchmarking data and the experimental benchmarking data, wherein the cross entropy difference represents the fidelity of the implementation of the constructed benchmarking circuits; and adjusting control parameters of the control model for implementing the two-qubit quantum gate to improve the fidelity of the parallel implementation of the constructed benchmarking circuits.

In some implementations the method further comprises estimating the fidelity of the implementation of the constructed benchmarking circuits as a function of circuit depth; and determining a measure of error-per-cycle by fitting the fidelity of the implementation of the constructed benchmarking circuits as a function of circuit depth to an exponential.

In some implementations the control parameters of the control model comprise control angles of one or more quantum gates.

In some implementations the array of qubits comprises a 2D array, and wherein the multiple layers of instances of the two-qubit gate comprise four layers of instances of the two-qubit gate.

The subject matter described in this specification can be implemented in particular ways so as to realize one or more of the following advantages.

A system implementing the techniques described in this specification enables multi-qubit entangling gates to be effectively and efficiently benchmarked. Compared to other techniques, e.g., techniques where single copies of a multi-qubit gate are benchmarked individually, the presently described techniques provide a reduction in benchmarking runtime to constant time and are therefore easily scalable. In addition, compared to other techniques, e.g., techniques where non-idealities of quantum hardware operation such as crosstalk and unwanted qubit interactions are ignored, the presently described techniques allow for such non-idealities to be captured whilst maintaining the tractability of the benchmarking process.

The presently described techniques can be applied to improve quantum computing hardware. Benchmarking results such as quantum gate fidelities can be used to determine adjustments that may improve the accuracy of existing quantum computing hardware, e.g., improve the accuracy at which the quantum computing hardware performs quantum operations. For example, the benchmarking results can be used to adjust control models used to implement quantum gates. Errors in adjusted control models can be less sensitive to drift, since error is quadratic and the determined adjustments produce control models that are increasingly accurate. Benchmarking results can also be used to calibrate or validate the quantum computing hardware.

Details of one or more implementations of the subject matter of this specification are set forth in the accompanying drawings and the description below. Other features, aspects, and advantages of the subject matter will become apparent from the description, the drawings, and the claims.

DETAILED DESCRIPTION

Overview

A quantum circuit is a model for quantum computation in which quantum logic gates are applied in a specific sequence to a register of qubits to encode quantum information. In theory, any quantum algorithm can be implemented with high precision by applying a correctly chosen sequence of quantum logic gates. However, in practice quantum logic gates are error prone—experiments attempt to implement unitary quantum operations representing ideal quantum logic gates but what are actually implemented are noisy quantum operations.

Benchmarking techniques can be applied to determine how close a noisy quantum operation performed by quantum hardware is to an ideal unitary quantum operation, and thereby characterize quantum hardware performance. For example, benchmarking techniques can be applied to characterize the performance of implementations of two-qubit quantum gates. This can include using the quantum hardware to execute random quantum circuits that include multiple instances of the two-qubit gate, and using a classical computer to simulate the same random quantum circuits. The results of the quantum computations and classical computations can be compared to determine how noisy the quantum operations were as well as their fidelity and purity.

For quantum hardware that includes a square array of N qubits with nearest-neighbor connectivity, there are ~2N pairs of nearest neighboring qubits, each with a two-qubit gate to characterize. Since benchmarking a single entangling gate that operates on a respective pair of qubits can take several minutes, benchmarking 2N pairs of qubits sequentially is expensive and scales linearly with system size. In addition, operating a single two-qubit gate in isolation is different from operating it in the context of a complex algorithm on a large device, since non-idealities such as crosstalk and unwanted interactions affect the implementations of the two-qubit gate. However, measuring large qubit systems using known benchmarking techniques such as cross-entropy benchmarking directly becomes computationally intractable due to the large Hilbert space.

This specification describes techniques for benchmarking multi-qubit quantum gates in parallel to efficiently and effectively assess quantum computing hardware performance. The set of multi-qubit quantum gates to be characterized is partitioned into multiple that can execute simultaneously. A separate benchmarking experiment is then performed for each layer, where all the multi-qubit gates in the layer are executed in parallel. This enables system-level non-idealities to be captured, whilst maintaining the low-complexity of the classical simulation since each qubit nominally only interacts with one neighbor so each pair of qubits can be classically simulated individually.

Example Hardware

Figure 1:
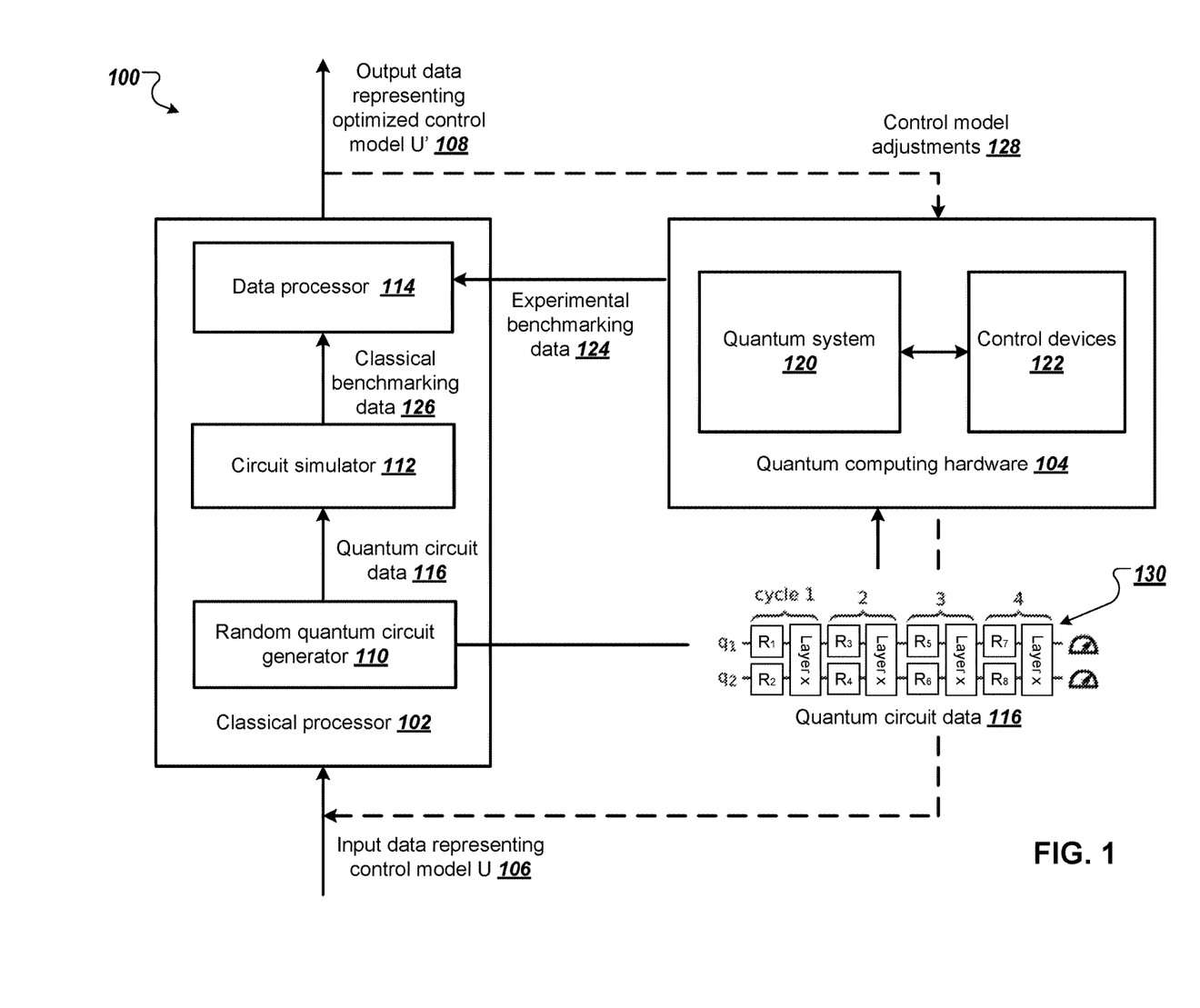
FIG. 1 depicts an example system for benchmarking the performance of quantum computing hardware.

FIG. 1 depicts an example system for benchmarking the performance of quantum computing hardware. The example system 100 is an example of a system implemented as classical and quantum computer programs on one or more classical and quantum computers in one or more locations, in which the systems, components, and techniques described below can be implemented.

The system 100 includes a classical processor 102 in data communication with quantum computing hardware 104. For convenience, the classical processor 102 and quantum computing hardware 104 are illustrated as separate entities, however in some implementations the classical processor 102 can be included in quantum computing hardware 104, e.g., the quantum computing hardware 104 can include one or more components for performing classical computing operations.

The quantum computing hardware 104 includes components for performing quantum computations using quantum circuits. For example, the quantum computing hardware 104 includes a quantum system 120 and control devices 122. The quantum system 120 includes one or more multi-level quantum subsystems, e.g., qubits, that are used to perform algorithmic operations or quantum computations. The specific realization of the multi-level quantum subsystems that the quantum computing hardware 104 includes and how they interact with one another is dependent on a variety of factors including the type of quantum computations that the quantum computing hardware is performing. For example, the multi-level quantum subsystems may include qubits that are realized via atomic, molecular or solid-state quantum systems. In other examples the qubits may include, but are not limited to, superconducting qubits or semi-conducting qubits.

The multi-level quantum subsystems can be frequency tunable. For example, each qubit may have associated operating frequencies that can be adjusted, e.g., using one or more control devices 122, through application of voltage pulses via one or more drivelines coupled to the qubit. Example operating frequencies include qubit idling frequencies, qubit interaction frequencies, and qubit readout frequencies. Different frequencies correspond to different operations that the qubit can perform. For example, setting the operating frequency to a corresponding idling frequency may put the qubit into a state where it does not strongly interact with other qubits, and where it may be used to perform single-qubit gates. As another example, in cases where qubits interact via couplers with fixed coupling, qubits can be configured to interact with one another by setting their respective operating frequencies at some gate-dependent frequency detuning from their common interaction frequency. In other cases, e.g., when the qubits interact via tunable couplers, qubits can be configured to interact with one another by setting the parameters of their respective couplers to enable interactions between the qubits and then by setting the qubit's respective operating frequencies at some gate-dependent frequency detuning from their common interaction frequency. Such interactions may be performed in order to perform multi-qubit gates, e.g., the two-qubit gates described in this specification.

The control devices 122 can further include measurement devices, e.g., readout resonators. Measurement results (measurement data) obtained via measurement devices may be provided to classical processors included in the quantum computing hardware 104 or to the classical processor 102 for processing and analyzing.

The classical processor 102 receives as input data 106 representing a control model $U(\theta, \phi)$) for implementing an entangling two-qubit quantum gate (herein referred to as a two-qubit gate). For example, $U(\theta, \phi)$) can represent a fermionic simulation gate, e.g., modelled as an iSWAP($\theta$) followed by a Cphase($\phi$)gate (and optionally one or more single qubit Z gates), where $\theta, \phi$ represent specific control angles for the fermionic simulation gate. A control model represents a mapping between parameters of a quantum gate (e.g. qubit rotation angle, phases, etc.) and control parameters of the physical system used to implement the quantum gate (e.g. control line voltages, pulse shapes, operating frequencies etc.).

The classical processor 102 processes the received input data 106 to generate as output data 108 representing an adjusted control model $U(\theta', \phi')$. For example, the output data 108 may include a control model whose model parameters $\theta, \phi$ have been adjusted such that the control model $U(\theta', \phi')$ provides a representation of the two-qubit gate that, when implemented by the quantum computing hardware 104, achieves improved gate fidelity.

The classical processor 102 includes multiple components for processing received input data. For example, the classical processor 102 can include a random quantum circuit generator 110, circuit simulator 112, and a data processing module 114.

The random quantum circuit generator 110 can be configured to define quantum circuits based on the quantum computing hardware 104 (e.g., the number of qubits included in the quantum computing hardware, how they are arranged and how they interact with one another) and the received input data 106. For example, the random quantum circuit generator 110 can be configured to define initial quantum circuits that include multiple instances of the two-qubit gate specified in the input data 106, where each instance of the two-qubit gate performs a same operation on a respective pair of interacting qubits in the quantum system 120. In some implementations the instances of the two-qubit gate operate on all possible pairs of interacting qubits in the 2D array of qubits. An example initial quantum circuit is illustrated and described below with reference to FIG. 2A.

The random quantum circuit generator 110 can also be configured to define random benchmarking quantum circuits based on defined initial quantum circuits. Each initial quantum circuit defined by the random quantum circuit generator 110 can be partitioned into multiple layers, where instances of the two-qubit gate in a respective layer can be implemented in parallel. An example partitioning of an initial quantum circuit into multiple layers where instances of the two-qubit gate in each layer can be implemented in parallel is illustrated and described below with reference to FIG. 2A.

The random quantum circuit generator 110 uses this property to define the random benchmarking quantum circuits, where each defined random benchmarking quantum circuit corresponds to a respective partitioned layer of instances of the two-qubit gate.

To define a benchmarking quantum circuit corresponding to a respective partitioned layer of instances of the two-qubit gate, the random quantum circuit generator 110 is configured to randomly sample single qubit gates from a predefined set of single qubit gates, e.g., a set of single qubit gates that can be implemented by quantum hardware 104. Each randomly sampled single-qubit quantum gate corresponds to a respective qubit in the quantum system 120. In addition, each qubit in the quantum system at each cycle has an associated single-qubit gate. In some implementations the random quantum circuit generator 110 is configured to implement one or more rules for sampling and assigning single-qubit gates, as described in more detail below with reference to FIG. 3.

To generate the benchmarking quantum circuit corresponding to the respective partitioned layer of instances of the two-qubit gate, the random quantum circuit generator 110 is configured to define cycles of quantum gates, where each cycle includes a respective instance of randomly sampled single qubit gates followed by the layer of instances of the two-qubit gate. The number of cycles included in a benchmarking quantum circuit defines the depth of the benchmarking quantum circuit. In some implementations the random quantum circuit generator 110 defines multiple benchmarking quantum circuits of different depths, e.g., so that the system can estimate circuit fidelity as a function of circuit depth.

Quantum circuit 130 is an example of a random benchmarking quantum circuit generated by the random quantum circuit generator 110. Example quantum circuit 130 shows a benchmarking quantum circuit that is configured to operate on two qubits $q_1$, $q_2$. The example quantum circuit 130 includes four cycles, where each cycle includes two randomly sampled single qubit gates, e.g., cycle 1 includes randomly sampled single qubit gates $R_1$, $R_2$ that operate on qubits $q_1$, $q_2$, respectively, cycle 2 includes randomly sampled single qubit gates $R_3$, $R_4$ that operate on qubits $q_1$, $q_2$, respectively, etc. Each cycle also includes a respective layer "Layer x" of instances of the two-qubit gate.

The classical processor 102 is configured to transmit data 116 representing defined benchmarking quantum circuits to the quantum computing hardware 104. The quantum computing hardware 104 is configured to implement the defined benchmarking quantum circuits using the quantum system 120 and control devices 122. Because of the specific construction of the benchmarking quantum circuits defined by the random quantum circuit generator 110, the quantum computing hardware 104 implements two-qubit gates in each layer of instances of the two-qubit gate in parallel.

The quantum computing hardware 104 can provide as output data representing results of the circuit implementations, e.g., experimental benchmarking data 124, and transmit the data to the classical processor 102. In some implementations the classical processor 102 can process the received experimental benchmarking data 124 (that includes data corresponding to the entire many-qubit Hilbert space) to extract data for each pair of qubits, e.g., to extract data corresponding to collections of two-qubit Hilbert spaces, where the two-qubit Hilbert spaces can be analyzed independently. For example, the experimental benchmarking data 124 can include multiple n-bit bit strings representing results of measuring all qubits at the same time. To analyze this data, data corresponding to each pair of qubits can be considered separately (as if pairs of qubits have been benchmarked separately). The classical processor 102 can convert data (bit strings) corresponding to each pair of qubits into probabilities for the four possible two-qubit output states 00, 10, 01, 11. These probabilities can be used in the processing steps described below.

The classical processor 102 is also configured to provide the data 116 representing defined benchmarking quantum circuits to the circuit simulator module 112. The circuit simulator module 112 is configured to perform classical computations to simulate implementations of the benchmarking quantum circuits defined by the data 116, e.g., to calculate an output distribution of ideal implementations of the constructed benchmarking circuits using a best known control model $U(\theta,\phi)$). The circuit simulator 112 can provide as output data representing results of the circuit simulations, e.g., classical benchmarking data 126, to a processing module 114 included in the classical processor 102.

The data processing module 114 is configured to process the experimental benchmarking data 124 received from the quantum computing hardware 104 and the classical benchmarking data 126 received from the circuit simulator 112.

Processing the experimental and classical benchmarking data can include applying cross-entropy benchmarking techniques where cross entropy is used as a measure of correspondence between the experimental benchmarking data and the classical benchmarking data representing the output distribution of the ideal circuits. For example, the data processing module 114 can be configured to determine a cross entropy (or an average cross entropy) of the experimental benchmarking data 124 and of the classical benchmarking data 126. The (average) cross entropy difference can be used as an estimate of the fidelity of the two-qubit gate—a property that holds for both incoherent errors and coherent errors, with the difference that in the case of coherent errors the fluctuations around the mean are larger than in the case of incoherent errors. Other measures of fidelity may additionally or alternatively be used. By estimating the fidelity of the two-qubit gate as a function of circuit depth, the data processing module 114 can further determine a measure of error-per-cycle by fitting the fidelity as a function of circuit depth to an exponential.

The data processing module 114 is further configured to use the estimated fidelity of the two-qubit gate to determine adjusted control parameters $\theta',\phi'$ of the control model $U'$ specified by the input data 106. For example, the control parameters $\theta,\phi$ can be adjusted to minimize an error as estimated by the applied benchmarking techniques, i.e., the control model $U(\theta,\phi)$) is "fitted" to the benchmarking data to maximize the correspondence between the control model and the data.

The classical processor 102 provides as output data representing the adjusted control model $U(\theta',\phi')$. In some implementations an outer loop may be performed to find optimal values of the control parameters to further improve the performance of the quantum computing hardware 104, i.e. the method may be iterated. An adjusted control model $U(\theta',\phi')$ can be used by the system 100 to perform the two-qubit quantum gate in future applications, e.g., as part of a quantum computation performed by the quantum computing hardware 104.

Figure 2A:
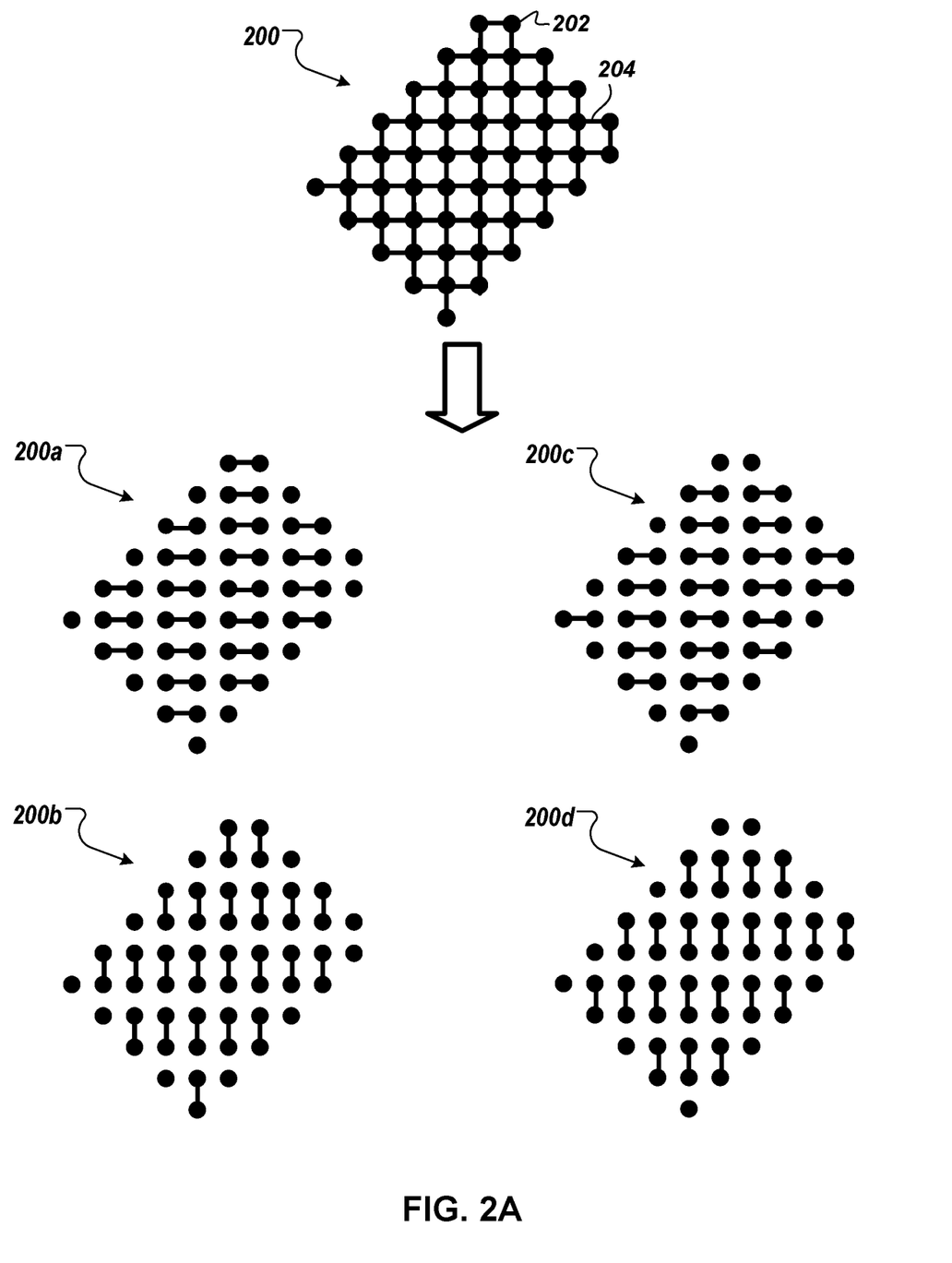
FIG. 2A illustrates an example partitioning of an initial quantum circuit into multiple layers that can be implemented in parallel.

FIG. 2A illustrates an example partitioning of an initial quantum circuit 200 into multiple layers 200a-200d that can be implemented in parallel. The example initial quantum circuit 200 operates on a square array of qubits, e.g., qubit 202 (though it will be appreciated that other array shapes may alternatively be used). The example initial quantum circuit 200 includes multiple instances of a two-qubit gate that is configured to operate on nearest-neighboring pairs of qubits, e.g., two-qubit gate 204. Each neighboring pair of qubits in the square array is operated on by a respective two-qubit gate. To benchmark each of the two-qubit gates shown in circuit 200 individually and sequentially is computationally expensive and scales linearly with system size.

The example initial quantum circuit 200 can be partitioned into multiple layers of instances of the two-qubit gate, in this example four layers, where instances of the two-qubit gate in a respective layer can be implemented in parallel. For example, layers 200a-200d each include a respective subset of the multiple instances of the two-qubit gate included in the example initial quantum circuit 200. Since each qubit in each layer 200a-200d is only operated on by one two-qubit gate, the two-qubit gates in each of the layers 200a-200d can be implemented in parallel. Therefore, benchmarking each of the two-qubit gates shown in circuit 200 can be performed in groups and independently of system size in constant time.

Figure 2B:
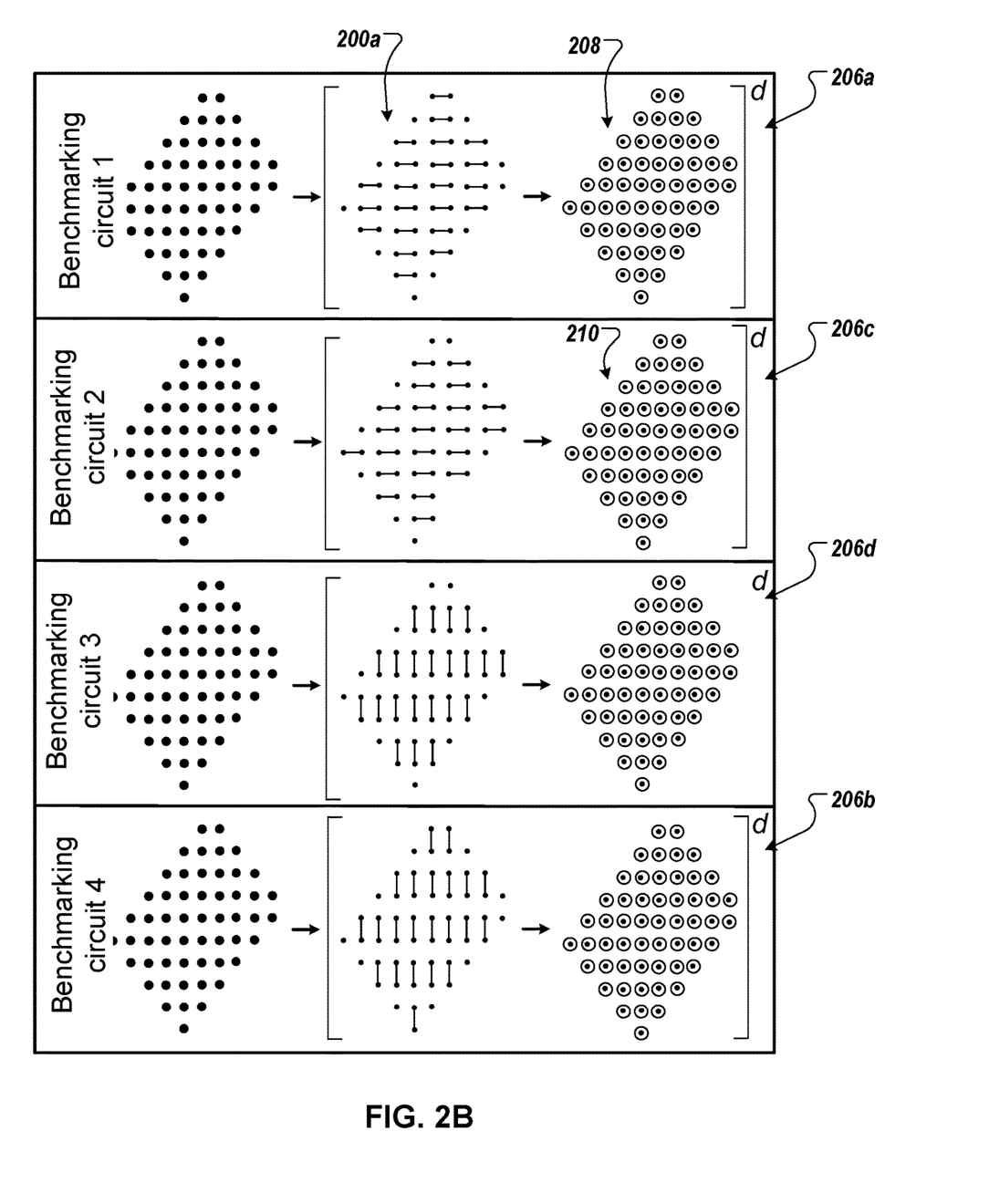
FIG. 2B illustrates example benchmarking quantum circuits.

FIG. 2B illustrates example benchmarking quantum circuits 206a-206d that correspond to the multiple layers 200a-200d of FIG. 2A. Each benchmarking quantum circuit 206a-206d includes d cycles of quantum gates, where each cycle includes a layer of randomly sampled single qubit gates followed by the respective partitioned layer of two-qubit gates. For example, benchmarking circuit 206a includes d cycles of quantum gates, where each cycle includes a layer of randomly sampled single qubit gates, e.g., layer 208, followed by the corresponding partitioned layer of two-qubit gates, e.g., layer 200a of FIG. 2A. Benchmarking circuit 206c includes d cycles of quantum gates, where each cycle includes a layer of randomly sampled single qubit gates, e.g., layer 210 (which is different to layer 208, since each layer of single qubit gates is constructed using a separate random sampling), followed by the corresponding partitioned layer of two-qubit gates, e.g., layer 200c of FIG. 2A, etc.

Programming the Hardware

Figure 3:
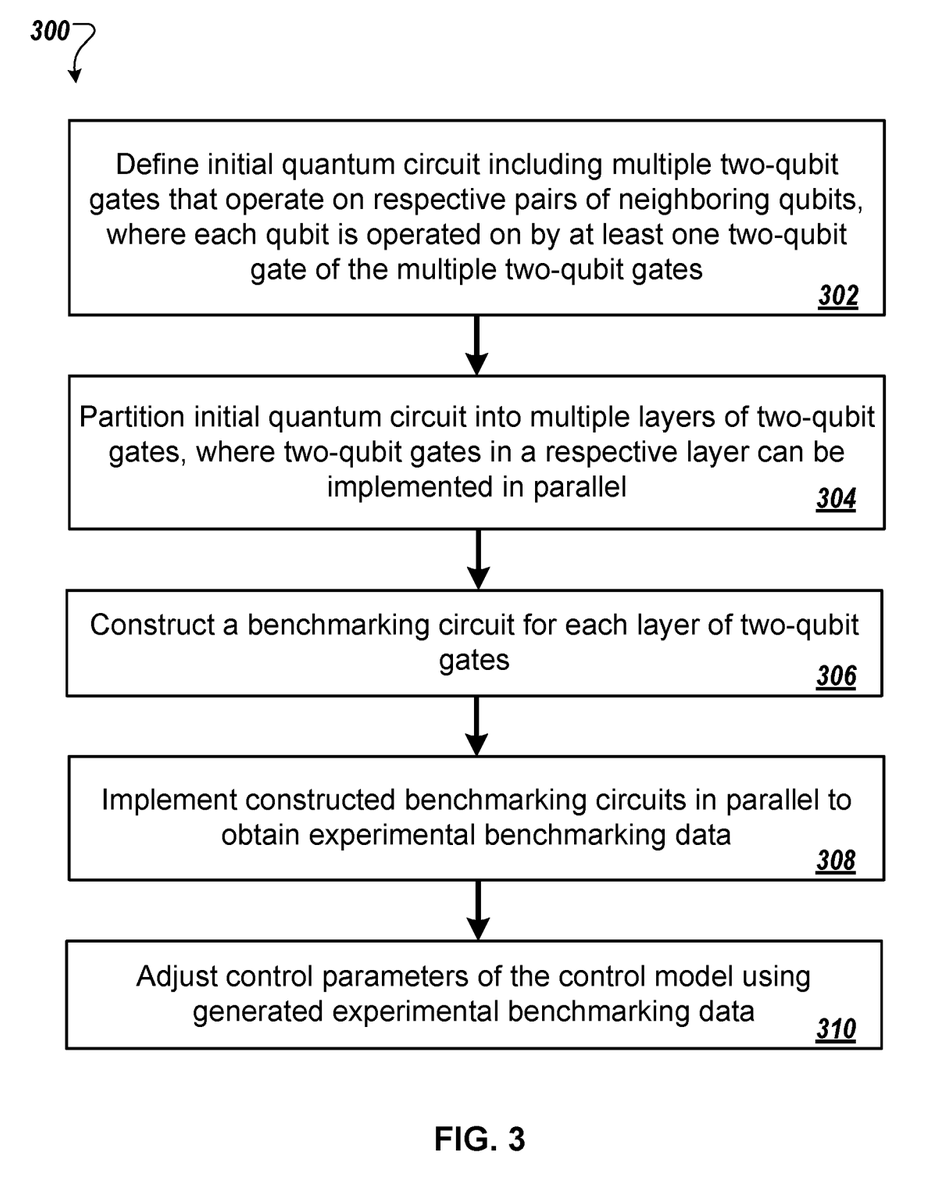
FIG. 3 is a flow diagram of an example process for adjusting a control model for implementing a two-qubit quantum gate.

FIG. 3 is a flow diagram of an example process 300 for adjusting to a control model for implementing a two-qubit quantum gate. For convenience, the process 300 will be described as being performed by a system of one or more classical and quantum computing devices located in one or more locations. For example, the system 100 of FIG. 1, appropriately programmed in accordance with this specification, can perform the process 300.

The system defines a control model for implementing the two-qubit quantum gate (step 302). For example, the system can define an approximate control model for implementing the two-qubit quantum gate after running basic calibration operations.

The system adjusts the control model for implementing the two-qubit gate. Adjusting the control model can include the following steps:

The system defines an initial quantum circuit configured to operate on a 2D array of qubits (step 304). The initial quantum circuit includes multiple instances of the two-qubit gate, where each instance of the two-qubit gate performs a same operation on a respective pair of neighboring qubits in the 2D array of qubits. In some implementations the multiple instances of the two-qubit gate operate on all pairs of neighboring qubits in the 2D array of qubits, as shown and described above with reference to FIG. 2A.

The system partitions the initial quantum circuit into multiple layers of instances of the two-qubit gate, where instances of the two-qubit gate in a respective layer can be implemented in parallel (step 306). The number of layers that the initial quantum circuit is partitioned into is dependent on the array of qubits. For example, in a square array of qubits, the initial quantum circuit can be partitioned into four layers of instances of the two-qubit gate, as shown above with reference to FIG. 2B.

The system performs separate benchmarking experiments for each layer of instances of the two-qubit gate. For each layer of instances of the two-qubit gate, the system constructs a benchmarking circuit for the layer (step 308). The benchmarking circuit for the layer includes one or more cycles of quantum gates. Each cycle includes the layer of instances of the two-qubit gate and multiple single qubit gates, where each single qubit gate corresponds to a respective qubit in the 2D array of qubits. To construct a benchmarking circuit for a layer of two-qubit gates, the system selects a circuit depth d for the benchmarking circuit and assigns d clock cycles of quantum gates to the 2D array of qubits. In some implementations the system selects multiple circuit depths and constructs multiple benchmarking circuits corresponding to the multiple circuit depths.

To assign a clock cycle of quantum gates to the 2D array of qubits, the system randomly samples multiple single-qubit quantum gates from a predetermined set of single-qubit quantum gates. For example, the system can randomly sample single-qubit quantum gates from a set of quantum gates that includes $X_{1/2}$, $Y_{1/2}$, and T quantum gates. Each randomly sampled single-qubit quantum gate corresponds to a respective qubit in the 2D array of qubits, and the number of randomly sampled single-qubit quantum gates can be equal to the number of qubits in the 2D array, i.e., a respective randomly sampled single-qubit quantum gate is assigned to each qubit in the 2D array of qubits.

In some implementations the system may implement one or more rules for assigning the randomly sampled single-qubit quantum gates to the 2D array of qubits. For example, the system may implement a rule whereby any single-qubit quantum gate assigned to a qubit q in the 2D array for a current clock cycle should be different from the single-qubit quantum gate assigned to the qubit q in the 2D array for the preceding cycle.

The system then assigns the randomly sampled multiple single-qubit quantum gates to respective qubits in the 2D array of qubits, and assigns the two-qubit gates in the layer of two-qubit gates to respective pairs of nearest neighboring qubits in the 2D array of qubits. Example benchmarking circuits for a square array of qubits and with circuit depth d are illustrated above with reference to FIG. 2.

The system implements the constructed benchmarking circuits to obtain experimental benchmarking data (step 310). To implement each constructed benchmarking circuit, the system initializes each qubit in the 2D array of qubits in an initial state $|0\rangle^{\otimes n}$, applies the constructed benchmarking circuit to the initialized qubits in the 2D array of qubits, and measures each qubit in the 2D array of qubits to obtain measurement data for each qubit. In some implementations the system may also apply a Hadamard gate to each qubit after initializing the qubits in the 2D array of qubits in the initial state and before the constructed benchmarking circuit is applied. Since instances of the two-qubit gate in each of the one or more cycles included in the benchmarking circuits can be implemented in parallel, as described above with reference to step 304, applying the constructed benchmarking circuit to the initialized qubits in the 2D array of qubits includes applying instances of the two-qubit gate in each of the one or more cycles included in the benchmarking circuit in parallel. Since the qubits are divided up into pairs, the simulation cost is linear in the circuit depth.

The system then extracts experimental benchmarking data from the measurement data for each qubit. For example, the system can process the received measurement data (that includes data corresponding to the entire many-qubit Hilbert space) to extract data for pairs of qubits, e.g., extract data corresponding to collections of two-qubit Hilbert spaces, where the two-qubit Hilbert spaces can be analyzed independently.

The system adjusts control parameters of the control model for implementing the two-qubit quantum gate using the generated experimental benchmarking data (step 312). For example, the system can classically simulate each constructed benchmarking circuit to obtain classical benchmarking data that represents output distribution of ideal implementations of the constructed benchmarking circuits. The system can then compare the classical benchmarking data to the experimental benchmarking data. For example, the system can apply cross-entropy benchmarking techniques to estimate a fidelity of the implementations of the constructed benchmarking circuits. In implementations where the system constructs multiple benchmarking circuits corresponding to multiple circuit depths, the system can estimate the fidelity as a function of circuit depth and determine a measure of error-per-cycle by fitting the fidelity as a function of circuit depth to an exponential.

The system can then use the estimated fidelity to adjust control parameters of the control model for implementing the two-qubit quantum gate to improve the fidelity of the implementation of the two-qubit quantum gates. The system can use the adjusted control model to implement the two-qubit quantum gate with increased fidelity in future quantum computations.

Figure 4A:
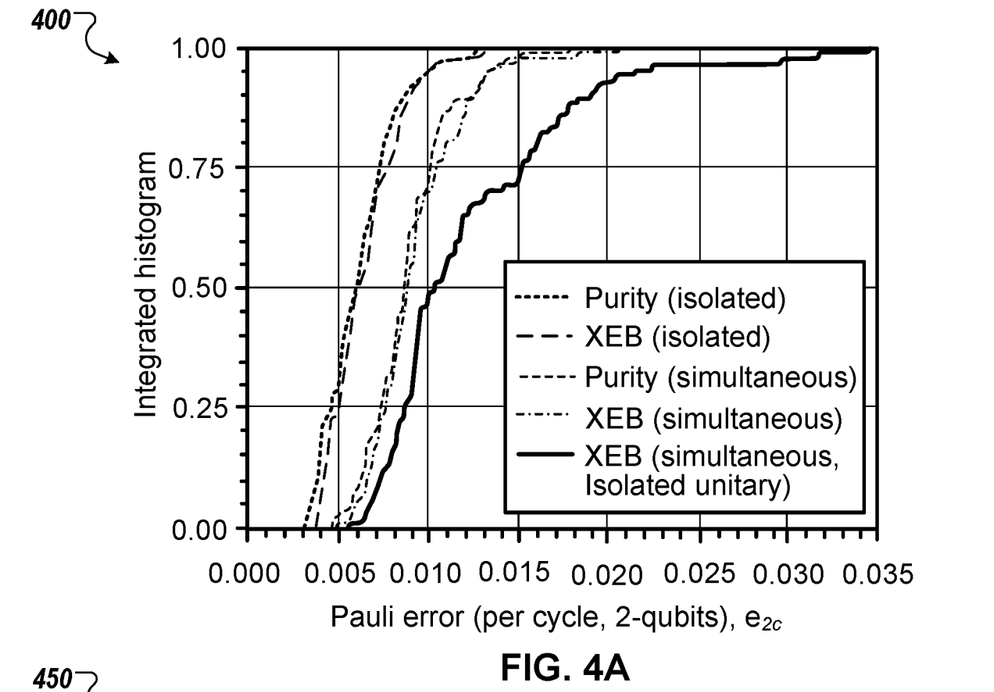
FIG. 4A shows an example plot of differences in gate behavior between individual and parallel operation due to such control crosstalk and stray qubit-qubit interactions.

As already described in this specification, operating a single two-qubit gate in isolation is different from operating it in the context of a complex algorithm on a large device, since non-idealities such as crosstalk and unwanted interactions affect the implementations of the two-qubit gate. FIG. 4A shows an example plot 400 of the differences in gate behavior between individual and parallel operation due to such control crosstalk and stray qubit-qubit interactions. Plot 400 shows how, for both isolated experiments and parallel experiments implemented according to example process 300 of FIG. 3, the optimized benchmarking error is close to purity-limited. Parallel operation increases the error, by approximately 0.003. This increase is primarily from purity error, which can arise from unintended interactions with other qubits, where coherent errors at the system scale manifest as incoherent errors when individual pairs are focused on. The unitaries obtained in implementations of example process 300 of FIG. 3 differ slightly from the isolated case—this is shown by applying the unitaries from the isolated optimization to the data from the parallel experiment of FIG. 3, which increases the error.

Figure 4B:
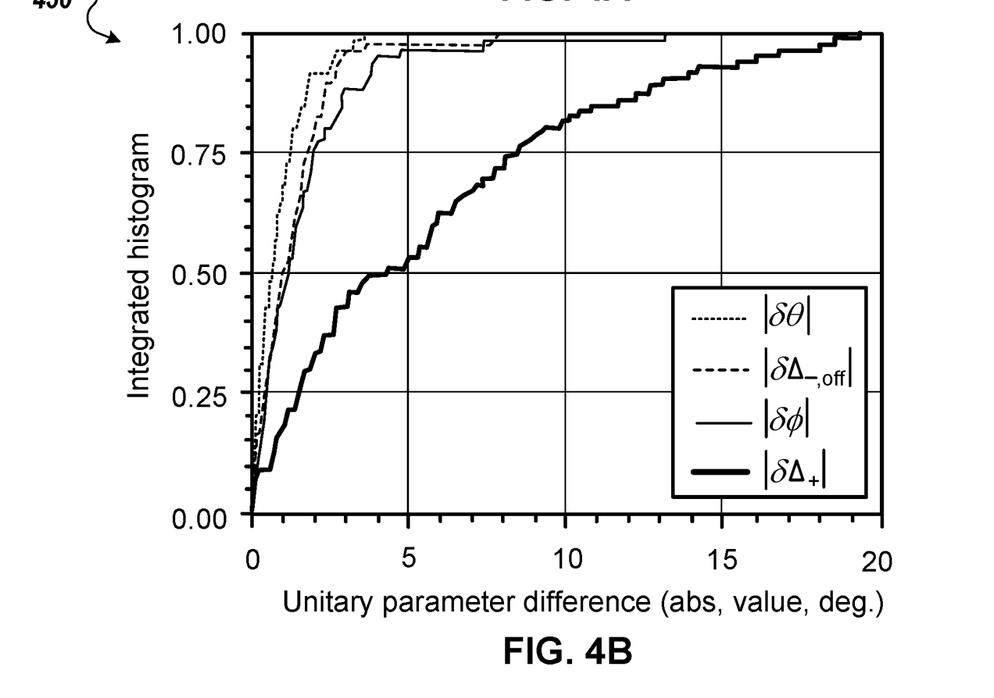
FIG. 4B shows an example plot of the differences in unitary model parameters between unitaries obtained in isolated experiments and parallel experiments

FIG. 4B shows an example plot 450 of the differences in unitary model parameters between unitaries obtained in isolated experiments and parallel experiments implemented according to example process 300 of FIG. 3. Plot 450 shows how the dominant change is in $\Delta$, a single-qubit phase. This shows that most of the added effects of operating in parallel at the single-qubit level can be accounted for and indicates that, in these particular experiments, there is no excessive stray entanglement.

Both plot 400 and 450 show that gate and qubit errors differ for qubits in isolation compared to interacting qubits in a 2D array, and show how a system implementing the techniques described in this specification can more accurately determine optimal parameters for implementing a target multi-qubit quantum gate on multiple qubits in a large device.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
defining a control model for implementing a two-qubit quantum gate;
adjusting the control model for implementing the two-qubit quantum gate, the adjusting comprising:
defining an initial quantum circuit configured to operate on an array of qubits, wherein the initial quantum circuit comprises multiple instances of the two-qubit gate, wherein each instance of the two-qubit gate performs a same operation on a respective pair of neighboring qubits in the array of qubits;
partitioning the initial quantum circuit into multiple layers of instances of the two-qubit gate, wherein instances of the two-qubit gate in a respective layer can be implemented in parallel;

for each of the multiple layers of instances of the two-qubit gate: constructing one or more benchmarking circuits for the layer, wherein each benchmarking circuit for the layer comprises one or more cycles of quantum gates, each cycle comprising: the layer of instances of the two-qubit gate, and a plurality of single qubit gates, wherein each single qubit gate in the plurality of single qubit gates corresponds to a respective qubit in the array of qubits;

implementing the constructed benchmarking circuits to obtain experimental benchmarking data; and adjusting control parameters of the control model for implementing the two-qubit quantum gate using the generated experimental benchmarking data.

2. The method of claim 1, wherein constructing a benchmarking circuit for a layer of instances of the two-qubit gate comprises assigning one or more clock cycles of quantum gates to the array of qubits, comprising, for each clock cycle:

randomly sampling multiple single-qubit quantum gates from a predetermined set of single-qubit quantum gates, wherein each randomly sampled single-qubit quantum gate corresponds to a respective qubit in the array of qubits;

assigning the randomly sampled multiple single-qubit quantum gates to respective qubits in the array of qubits, and assigning the instances of the two-qubit gate in the layer to respective pairs of nearest neighboring qubits in the array of qubits.

3. The method of claim 2, wherein the predetermined set of single-qubit quantum gates comprises $X_{1/2}$, $Y_{1/2}$, and T quantum gates, wherein $X_{1/2}$ represents a $\pi/2$ rotation around the X axis, x axis, $Y_{1/2}$ represents a $\pi/2$ rotation represents a $\pi/2$ rotation around the y axis, and T represents a non-Clifford diagonal matrix $\{0, e^{i\pi/4}\}$.

4. The method of claim 2, wherein assigning the randomly sampled multiple single-qubit quantum gates to respective qubits in the array of qubits comprises:

assigning a second single-qubit gate to qubit q for a current clock cycle, wherein the second single-qubit gate is different to a first single-qubit gate assigned to the qubit q for a preceding clock cycle.

5. The method of claim 1, wherein constructing one or more benchmarking circuits for the layer comprises constructing multiple benchmarking circuits with different respective circuit depths.

6. The method of claim 1, wherein implementing the constructed benchmarking circuits to obtain experimental benchmarking data comprises, for each constructed benchmarking circuit:

initializing each qubit in the array of qubits in an initial state;

applying the constructed benchmarking circuit to the initialized qubits in the array of qubits, wherein instances of the two-qubit gate in each layer of instances of the two-qubit gate are implemented in parallel;

measuring each qubit in the array of qubits to obtain measurement data for each qubit; and extracting experimental benchmarking data from the measurement data.

7. The method of claim 5, further comprising, prior to applying the constructed benchmarking circuit to the initialized qubits in the array of qubits, applying a Hadamard gate to each qubit in the initial state.

8. The method of claim 1, wherein adjusting control parameters of the control model for implementing the two-qubit quantum gate using the generated experimental benchmarking data comprises:

classically simulating each constructed benchmarking circuit to obtain classical benchmarking data that represents output distribution of ideal implementations of the constructed benchmarking circuits;

comparing the classical benchmarking data to the experimental benchmarking data, comprising determining the cross entropy difference between the classical benchmarking data and the experimental benchmarking data, wherein the cross entropy difference represents the fidelity of the implementation of the constructed benchmarking circuits; and adjusting control parameters of the control model for implementing the two-qubit quantum gate to improve the fidelity of the parallel implementation of the constructed benchmarking circuits.

9. The method of claim 8, further comprising:

estimating the fidelity of the implementation of the constructed benchmarking circuits as a function of circuit depth; and determining a measure of error-per-cycle by fitting the fidelity of the implementation of the constructed benchmarking circuits as a function of circuit depth to an exponential.

10. The method of claim 1, wherein the control parameters of the control model comprise control angles of one or more quantum gates.

11. The method of claim 1, wherein the array of qubits comprises a 2D array, and wherein the multiple layers of instances of the two-qubit gate comprise four layers of instances of the two-qubit gate.

12. An apparatus comprising:

one or more classical processors; and quantum computing hardware in data communication with the one or more classical processors, wherein the quantum computing hardware comprises:

an array of qubits, and control devices configured to operate the array of qubits;

wherein the apparatus is configured to perform operations comprising:

defining a control model for implementing a two-qubit quantum gate;

adjusting the control model for implementing the two-qubit quantum gate, the adjusting comprising:

defining an initial quantum circuit configured to operate on an array of qubits, wherein the initial quantum circuit comprises multiple instances of the two-qubit gate, wherein each instance of the two-qubit gate performs a same operation on a respective pair of neighboring qubits in the array of qubits;

partitioning the initial quantum circuit into multiple layers of instances of the two-qubit gate, wherein instances of the two-qubit gate in a respective layer can be implemented in parallel;

for each of the multiple layers of instances of the two-qubit gate: constructing one or more benchmarking circuits for the layer, wherein each benchmarking circuit for the layer comprises one or more cycles of quantum gates, each cycle comprising: the layer of instances of the two-qubit gate, and a plurality of single qubit gates, wherein each single qubit gate in the plurality of single qubit gates corresponds to a respective qubit in the array of qubits;

implementing the constructed benchmarking circuits to obtain experimental benchmarking data; and adjusting control parameters of the control model for implementing the two-qubit quantum gate using the generated experimental benchmarking data.

* * * * *